United States Patent
Bernal et al.

(10) Patent No.: US 9,405,974 B2
(45) Date of Patent: Aug. 2, 2016

(54) SYSTEM AND METHOD FOR USING APPARENT SIZE AND ORIENTATION OF AN OBJECT TO IMPROVE VIDEO-BASED TRACKING IN REGULARIZED ENVIRONMENTS

(71) Applicant: Xerox Corporation, Norwalk, CT (US)

(72) Inventors: Edgar A. Bernal, Webster, NY (US); Howard A. Mizes, Pittsford, NY (US); Robert P. Loce, Webster, NY (US)

(73) Assignee: Xerox Corporation, Norwalk, CT (US)

(*) Notice: Subject to any disclaimer, the term of this patent is extended or adjusted under 35 U.S.C. 154(b) by 172 days.

(21) Appl. No.: 14/078,765

(22) Filed: Nov. 13, 2013

(65) Prior Publication Data
US 2015/0131851 A1 May 14, 2015

(51) Int. Cl.
- G06K 9/00 (2006.01)
- G06T 7/00 (2006.01)
- G06T 7/20 (2006.01)
- G06K 9/20 (2006.01)

(52) U.S. Cl.
CPC ............ G06K 9/00711 (2013.01); G06K 9/209 (2013.01); G06T 7/0042 (2013.01); G06T 7/204 (2013.01); G06T 7/2033 (2013.01); G06T 7/2053 (2013.01); G06T 7/2066 (2013.01); *G06T 2207/10024* (2013.01); *G06T 2207/20036* (2013.01); *G06T 2207/20076* (2013.01); *G06T 2207/20144* (2013.01); *G06T 2207/30232* (2013.01); *G06T 2207/30236* (2013.01)

(58) Field of Classification Search
CPC .......... G06K 9/00771; G06K 9/00335; G06K 9/0055; G06K 9/00711; G06K 9/00765; G06K 9/3241; G06K 9/00785; G06K 9/6267; G06T 2207/10016; G06T 2207/30241; G06T 2207/30236; G06T 7/2053; G06T 7/2006; G06T 7/2093
USPC ........................................................ 382/103
See application file for complete search history.

(56) References Cited

U.S. PATENT DOCUMENTS

| | | | | |
|---|---|---|---|---|
| 5,376,807 A | * | 12/1994 | Liu | G06E 3/003 250/559.29 |
| 2009/0028440 A1 | * | 1/2009 | Elangovan | G06K 9/6202 382/216 |
| 2011/0002509 A1 | * | 1/2011 | Nobori | G06T 7/2006 382/103 |
| 2012/0098926 A1 | * | 4/2012 | Kweon | H04N 5/23238 348/36 |
| 2012/0287271 A1 | * | 11/2012 | Holland | G08B 13/19602 348/143 |
| 2014/0132758 A1 | * | 5/2014 | Saptharishi | H04N 7/18 348/135 |

OTHER PUBLICATIONS

G. Bradski, "Computer Vision Face Tracking for Use in a Perceptual User Interface," *Intel Technology Journal* Q2 1998, pp. 1-15.

(Continued)

*Primary Examiner* — Amara Abdi
(74) *Attorney, Agent, or Firm* — Fay Sharpe LLP

(57) ABSTRACT

A system and method for optimizing video-based tracking of an object of interest are provided. A video of a regularized motion environment that comprise multiple video frames is acquired and an initial instance of an object of interest in one of the frames is then detected. An expected size and orientation of the object of interest as a function of the location of the object is then determined. The location of the object of interest is then determined in a next subsequent frame using the expected size and orientation of the object of interest.

20 Claims, 12 Drawing Sheets
(5 of 12 Drawing Sheet(s) Filed in Color)

(56) References Cited

OTHER PUBLICATIONS

J. Ning et al., "Scale and Orientation Adaptive Mean Shift Tracking," *Institution of Engineering and Technology Computer Vision*, Jan. 2012, pp. 1-23.

D. Comaniciu et al., "Real Time Tracking of Non-Rigid Objects using Mean Shift," *In Proc. IEEE CVPR* 2000.

M. Isard et al., "Contour Tracking by Stochastic Propagation of Conditional Density," *In. Proc. Euro. Conf. Computer Vision*, 1996, pp. 343-356.

K. Smith et al., "Evaluating Multi-Object Tracking," Workshop on Empirical Evaluation Methods in Computer Vision, 2005.

J.Shi et al., "Good Features to Track," IEEE Conference on Computer Vision and Pattern Recognition, 1994, pp. 593-600.

C. Hue et al., "Tracking Multiple Objects with Particle Filtering," *IEEE Transactions on Aerospace and Electronic Systems*, vol. 38, No. 3, Jul. 2002, pp. 791-812.

K. Okuma, et al., "A Boosted Particle Filter: Multitarget Detection and Tracking," *Lecture Notes in Computer Science*, vol. 3021, 2004.

D. Ross et al., "Incremental Learning for Robust Visual Tracking," *Neural Information Processing Systems 17*, MIT Press, 2005, pp. 1-21.

\* cited by examiner

SYSTEM AND METHOD FOR USING APPARENT SIZE AND ORIENTATION OF AN OBJECT TO IMPROVE VIDEO-BASED TRACKING IN REGULARIZED ENVIRONMENTS

TECHNICAL FIELD

The presently disclosed embodiments are directed toward methods and systems of the transportation arts, tracking arts, video processing arts, predictive arts, and the like. More particularly, the teachings disclosed herein are applicable to methods and systems wherein video-based tracking of objects of interest in a regularized environment is optimized.

BACKGROUND

The proliferation of traffic and surveillance cameras and the increasing need for automated video analytics technologies have brought the topic of object tracking to the forefront of computer vision research. Real-world scenarios present a wide variety of challenges to existing object tracking algorithms including occlusions, changes in scene illumination, conditions and object appearance (color, shape, silhouette, salient features, etc.), as well as camera shake. While significant research efforts have been devoted to solving the general problem of robustly tracking groups of objects under a wide range of conditions, the environments encountered in traffic and surveillance situations are typically limited in scope with respect to directions and speeds at which objects move. Examples of implementations that rely on robust object tracking include video-based parking management and video-based vehicle speed estimation, measuring total experience time in retail spaces, and the like.

The aforementioned real-world scenarios present a wide variety of challenges to existing object tracking algorithms. An example of such a scenario is the use of a fish eye camera to determine "total experience time" of a vehicle in a drive-thru setting, i.e., an ultra-wide-angle lens that produces a hemispheric view of a scene created via the introduction of a lens that has a shape and index of refraction that captures all light forward of the camera and focuses it on the CCD chip. Two key issues that affect performance of appearance-based object tracking in video streams are (i) change in apparent size of an object due to perspective and/or distortion, and (ii) change in appearance of an object due to its orientation relative to the camera. For example, due to the projective nature of a camera, objects farther away from the camera appear smaller than objects closer by; this applies to both rectilinear and fisheye lens cameras. In addition, fisheye lenses usually introduce extreme barrel distortion in order to achieve wide angles of view. Barrel distortion results in spatially varying image magnification, wherein the degree of magnification decreases with an object's distance to the camera's optical axis. As another example, objects that are longer along one dimension than along others and that change orientation as they traverse the field of view of the camera are perceived to go through changes in aspect ratio, even in the absence of lens distortion.

While fisheye distortion is an extreme case of barrel distortion, usually associated with wide angle imaging systems, other types of distortion also occurs in imaging systems. For instance, telephoto lenses often possess pincushion distortion, where magnification increases with distance from the optical axis. A zoom lens, as those used in common PTZ (Pan-Tilt-Zoom) surveillance systems, can operate along a continuum from wide angle to normal (rectilinear) to telephoto, and possess respective distortions. Anamorphic optical systems may be used to form a panoramic view of a scene, where the distortion will differ in perpendicular directions.

Current attempts to estimate object size and orientation in addition to object location can be error-prone and may have increased computational complexity due to the higher-dimensional optimization space in projective and optically induced distortion.

Thus, it would be advantageous to provide an efficient system and method for video-based tracking of an object of interest that exploits the regularized conditions present in transportation scenarios to achieve robust and computationally efficient tracking that has object orientation and size awareness.

INCORPORATION BY REFERENCE

The following references, the disclosures of which are incorporated herein by reference, in their entirety, are mentioned.

G. Bradski, *Computer Vision Face Tracking for Use in a Perceptual User Interface*, Intel Technology Journal Q2 1998.

J. Ning, L. Zhang, D. Zhang and C. Wu, *Scale and Orientation Adaptive Mean Shift Tracking*, Institution of Engineering and Technology Computer Vision, January 2012.

D. Comaniciu et al., *Real Time Tracking of Non-Rigid Objects using Mean Shift*, in Proc. IEEE CVPR 2000.

M. Isard and A. Blake, *Contour Tracking by Stochastic Propagation of Conditional Density*, In. Proc. Euro. Conf. Computer Vision, 1996.

K. Smith et al., *Evaluating Multi-Object Tracking*, Workshop on Empirical Evaluation Methods in Computer Vision, 2005.

J. Shi and C. Tomasi, *Good Features to Track*, IEEE Conference on Computer Vision and Pattern Recognition, 1994.

C. Hue et al., *Tracking Multiple Objects with Particle Filtering*, IEEE Transactions on Aerospace and Electronic Systems, Vol. 38, No. 3, July 2002.

K. Okuma, et al., *A Boosted Particle Filter: Multitarget Detection and Tracking*, Lecture Notes in Computer Science, Volume 3021, 2004, D. Ross et al., *Incremental Learning for Robust Visual Tracking*, Neural Information Processing Systems 17, MIT Press, 2005.

BRIEF DESCRIPTION

In one aspect of the exemplary embodiment, a method for optimizing video-based tracking of an object of interest is provided. The method includes acquiring a video of a regularized motion environment comprising a plurality of video frames. The method also includes detecting an initial instance of at least one object of interest in the plurality of video frames including a location thereof, and determining an expected size and an expected orientation of the at least one object of interest as a function of the location. In addition, the method includes localizing the at least one object of interest in at least one subsequent video frame responsive to the determined size and orientation. A computer processor performs the acquiring, detecting, generating, determining, and/or localizing.

In another aspect, a system for optimizing video-based tracking of an object of interest is provided. The system includes a video acquisition unit configured for acquiring a video of a regularized motion environment in memory, the video comprising a plurality of frames. The system also includes an object detection unit configured for detecting an initial instance of an object of interest a frame of the plurality of video frames, and an object characterization unit configured for establishing a target object representation of the detected instance of the object of interest. Additionally, the system includes an object localization unit configured for determining a location of the object of interest in the frame in accordance with the target representation of the detected instance of the object of interest. The system further includes an object size and orientation unit configured for estimating a size and an orientation of the object of interest in a next subsequent frame as a function of the determined location. Furthermore, the system includes a processor which implements at least one of the video acquisition unit, the object detection unit, the object characterization unit, the object localization unit, and the object size and orientation unit.

In another aspect, a computer-implemented method for optimizing video-based tracking of an object of interest is provided. The computer-implemented method includes generating a binary mask of an instance of a detected object of interest in one of a plurality of video frames, and establishing a target object representation of the detected instance of the object of interest in accordance with the generated binary mask. In addition, the computer-implemented method includes determining a location of the object of interest in the frame in accordance with the target representation of the detected instance of the object of interest, and estimating a size and an orientation of the object of interest as a function of the location. The computer-implemented further includes localizing the object of interest in a next subsequent frame responsive to the estimated size and orientation.

In another aspect, a method for optimizing video-based tracking of an object of interest is provided. The method includes acquiring a video of a regularized motion environment comprising a plurality of video frames, and detecting an initial instance of at least one object of interest in an initial video frame of the plurality of video frames including detection of a location thereof. The method further includes localizing the at least one object of interest in a plurality of subsequent video frames, and determining an object trajectory of the at least one object of interest localized in the plurality of subsequent video frames. Furthermore, the method includes determining an expected size and an expected orientation of the at least one object of interest as a function of the determined trajectory, and localizing the at least one object of interest in at least one of the plurality of subsequent video frames based on the determined expected size and expected orientation. A computer processor performs at least one of the acquiring, detecting, localizing, determining, and localizing.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a brief description of the drawings, which are presented for the purposes of illustrating the exemplary embodiments disclosed herein and not for the purposes of limiting the same.

DETAILED DESCRIPTION

Figure 1:
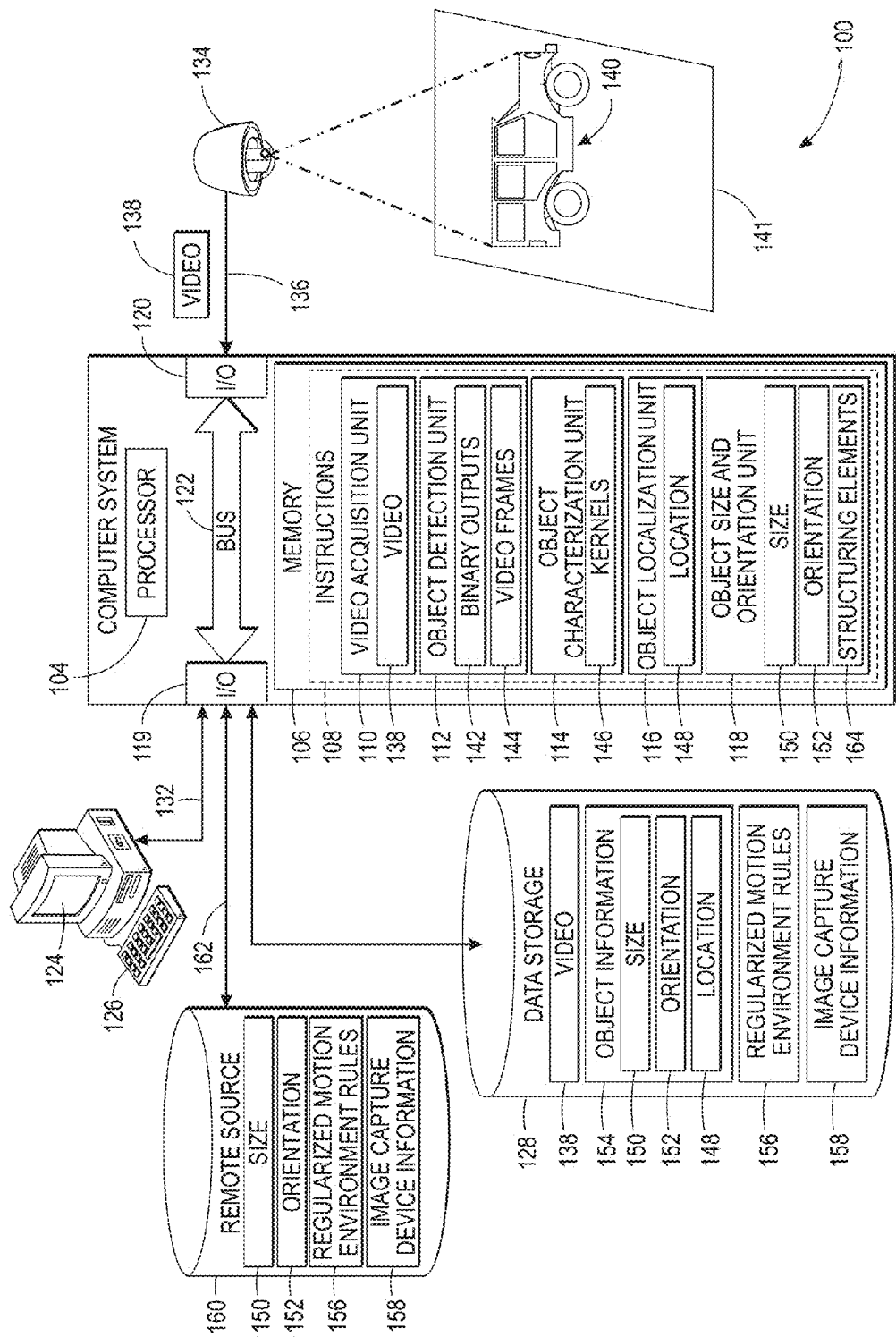
FIG. 1 is a functional block diagram of a video-based system for optimizing tracking an object of interest in accordance with one aspect of the exemplary embodiment.

One or more embodiments will now be described with reference to the attached drawings, wherein like reference numerals are used to refer to like elements throughout. Aspects of exemplary embodiments related to systems and methods for video-based tracking of objects of interest are described herein. In addition, example embodiments are presented hereinafter referring to tracking an object of interest in a regularized motion environment, such as tracking vehicles in a parking lot, on a highway, on a road, etc., or people in a building, in a park, on a sidewalk, etc., from acquired video, however application of the systems and methods set forth herein can be made to other areas of tracking or imaging operations.

According to one embodiment, there are provided systems and methods which extend object tracking via exploitation of a priori and/or learned knowledge of object size and orientation in a regularized motion environment in order to achieve robust and computationally efficient tracking. The systems and methods comprise the following modules or units: (1) a video acquisition module that captures or otherwise receives video of the area being monitored, (2) an object detection module that detects an initial instance of an object of interest in the incoming video; (3) an object characterization module that establishes a target object representation; (4) an object localization module that determines the location of the object being tracked on a frame-by-frame basis. The systems and methods set forth herein further include (5) an object size and orientation determination module that relays, e.g., provides feedback, on the size and orientation object information to modules (2), (3) and (4) as a function of the object location determined by module (4) as well as learned or manually input size and orientation data. According to one aspect, the object size and orientation unit can comprehend the geometry and orientation of the object to make an accurate estimate of the detected object size.

Referring now to FIG. 1, there is shown a functional block diagram of a video-based system 100 for tracking an object of interest in accordance with one aspect of the subject disclosure. It will be appreciated that the various components depicted in FIG. 1 are for purposes of illustrating aspects of the exemplary embodiment, and that other similar components, implemented via hardware, software, or a combination thereof, are capable of being substituted therein.

As shown in FIG. 1, the searching system 100 includes a computer system represented generally at 102, which is capable of implementing the exemplary method described below. It will be appreciated that while shown with respect to the computer system 102, any suitable computing platform may be utilized in accordance with the systems and methods set forth herein. The exemplary computer system 102 includes a processor 104, which performs the exemplary method by execution of processing instructions 108 which are stored in memory 106 connected to the processor 104, as well as controlling the overall operation of the computer system 102.

The instructions 108 include a video acquisition unit 110 operable to acquire video 138 of a scene of interest from an associated image capture device 134 via a suitable communications link 136, e.g., a video camera, still camera, etc. Suitable examples of such image capture devices 134 may include, for example, CMOS, CCD, and other types of cameras capable of recording or capturing moving images. According to one embodiment, the video acquisition unit 110 may be emplaced in a suitable regularized motion environment 141, e.g., a parking lot, street corner, thoroughfare, highway, or the like, the environment 141 having a set of rules 156 corresponding thereto. It will be appreciated that while illustrated in FIG. 1 as being directly coupled to the computer system 102, the image capture device 134 may be in communication with the computer system 102 via a communications network (not shown), such as, for example, a virtual local area network, a wide area network, a personal area network, a local area network, the Internet, an intranet, or any suitable combination thereof. The communications link 136 may be implemented as, for example, the public-switched telephone network, a proprietary communications network, infrared, optical, or other suitable wired or wireless data communications channel.

Figure 3:
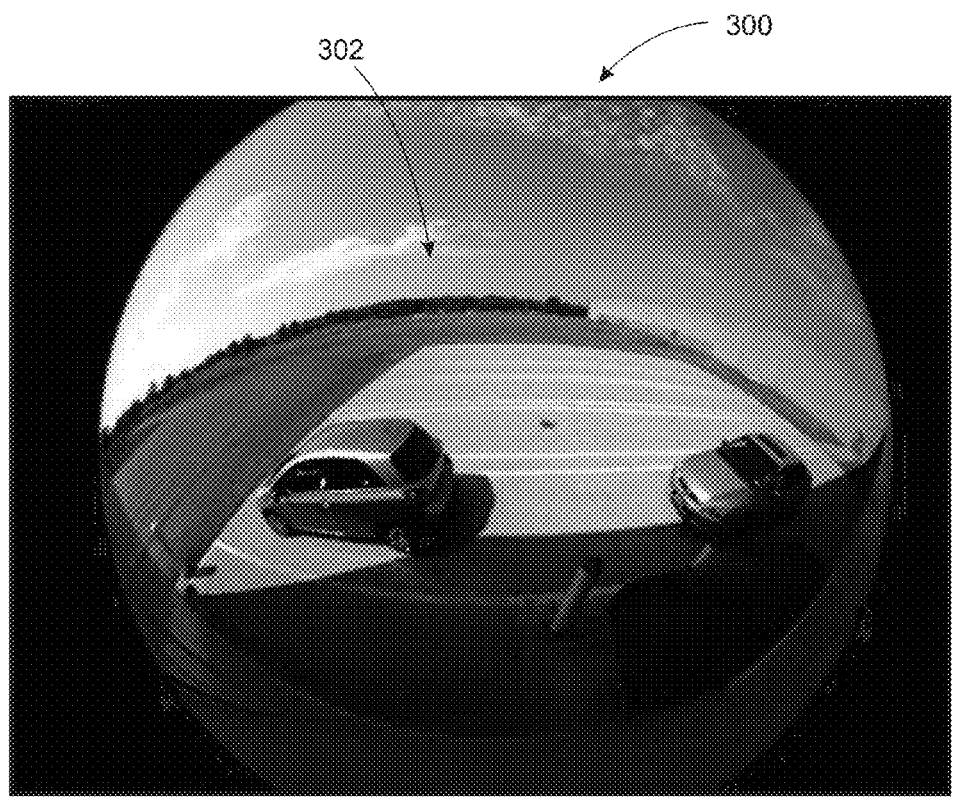
FIG. 3 is an illustration of a sample video frame captured with the video acquisition for use in the video-based system for optimizing tracking an object of interest in accordance with one aspect of the exemplary embodiment.

The image capture device 134 may be implemented as a video camera in communication with the video acquisition unit 110 to facilitate capturing or otherwise receiving video 138 of the area of interest. Alternatively, previously captured and stored video can be read from a database 128. It will be appreciated that in accordance with the systems and methods set forth herein, specific requirements in terms of spatial or temporal resolutions may not be needed. However, traditional surveillance cameras are typically IP cameras with pixel resolutions of VGA and above (640×480) and frame rates of 15 fps and above. It will therefore be appreciated that the systems and methods set forth herein are capable of operations using a plurality of different pixel resolutions and different frame rates. It will further be appreciated that a fisheye camera can provide a large field of view of a scene, but at the expense of suffering from large changes in the size of the object as it moves through the scene due to the aforementioned lens distortions associated with wide angles of view. In addition, image capture device information 158, e.g., the frame rate, position of device 134, angle, lens-type, and the like, may be utilized by the video acquisition unit 110 or other unit in the operations set forth below. FIG. 3 illustrates a sample video frame 300 captured with the video camera 134 containing an example area of interest 302 test area used for demonstration purposes, e.g., a parking lot.

The instructions 108 of the system 100 further include an object detection unit 112 that is configured to detect an initial instance of an object of interest 140 in the incoming video 138, i.e., the video 138 captured (from video camera 134) or obtained (from the database 140) by the video acquisition unit 110. In accordance with one embodiment, a double difference technique followed by morphological operations may be implemented by the object detection unit 112 to detect the initial instance of an object of interest 140 in the incoming video 138. The morphological operations discard objects in motion with size and orientation outside pre-determined ranges determined by the object size and orientation determination 118, discussed in detail below. The output of the operation is a binary mask 142 with the same pixel dimensions as the input video 138, and having values equal to 0 where no motion/foreground object is detected and values equal to 1 at pixel locations where the contrary is true.

In accordance with another embodiment, background estimation and subtraction may be used for foreground object detection, which requires estimation of the stationary scene background, followed by subtraction or comparison between the estimated background and the current frame, coupled with morphological operations to isolate blobs of the appropriate size. A background estimate can comprise an image obtained, for example, by performing a pixel-wise running or weighted average, or pixel-wise median computation of incoming video frames; alternatively, a background estimate can comprise a set of pixel-wise statistical models describing the historical behavior of pixel values. When subtracting a current frame with a background estimate, pixels that are above a pre-determined threshold are deemed to belong to the foreground; when comparing a current frame with a background estimate, pixels that are deemed not to fit their corresponding statistical model are deemed to belong to the foreground. The output of such approach is a binary mask 142, similar to the output by the double difference technique.

In accordance with one embodiment, the object detection unit 112 may be configured to detect an initial instance of an object of interest 140 via one or more external inputs. That is, the initial instance of an object of interest 140 in a field of view may be pre-determined based upon the position of an entryway (gate), a sensor/ticketing booth, or the like. In such an embodiment, the initial detection of the object of interest 140 would be ascertained upon the object 140 activating a gate (not shown) or triggering a sensor (not shown), such that the initial detection could occur prior to activation of video camera 134 to begin acquiring video 138 of the environment 141. Examples of triggering sensors include roadway sensors such as, but not limited to, pressure hoses, piezoelectric sensors and induction coils that are physically laid out on the or underneath the surface of the road. Other remote-sensing systems such as radar- and laser-based systems can be employed. It will be appreciated that such an embodiment is capable of implementation in accordance with the systems and methods set forth herein and as explained in greater detail below.

Figure 4A:
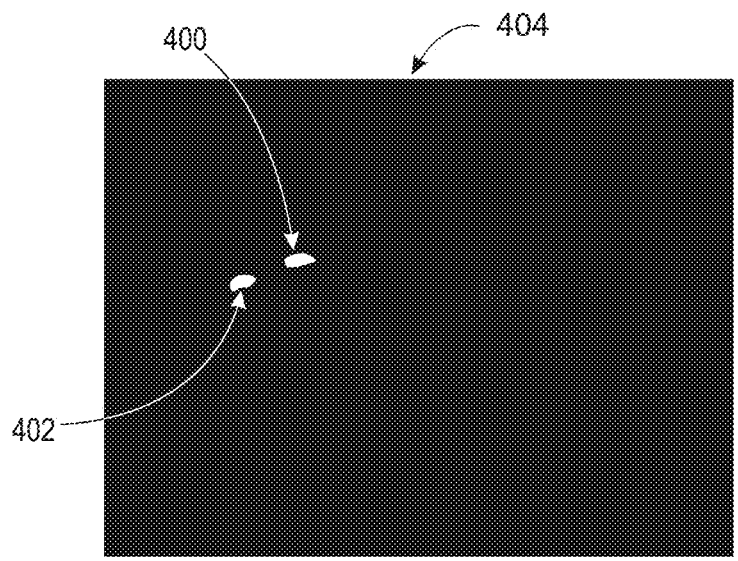
FIGS. 4A-4F are illustrations of binary outputs and corresponding video frames from the object detection unit of the video-based system for optimizing tracking an object of interest in accordance with one aspect of the exemplary embodiment.
Figure 4B:
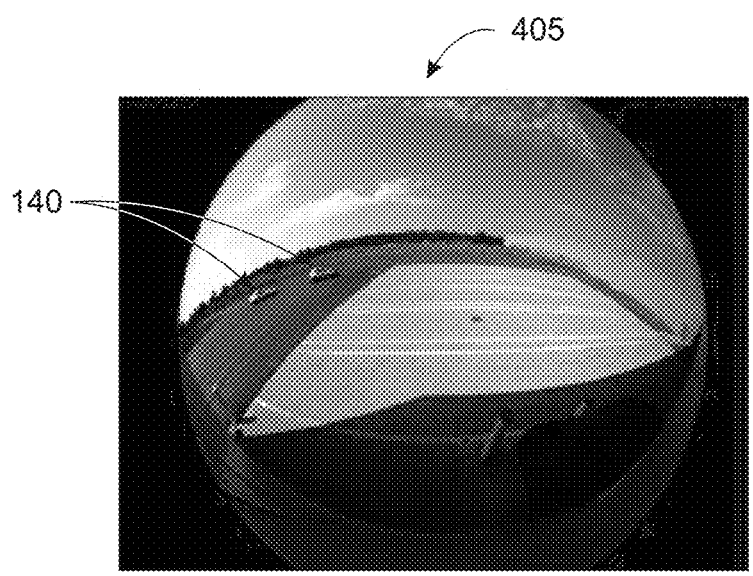
Figure 4C:
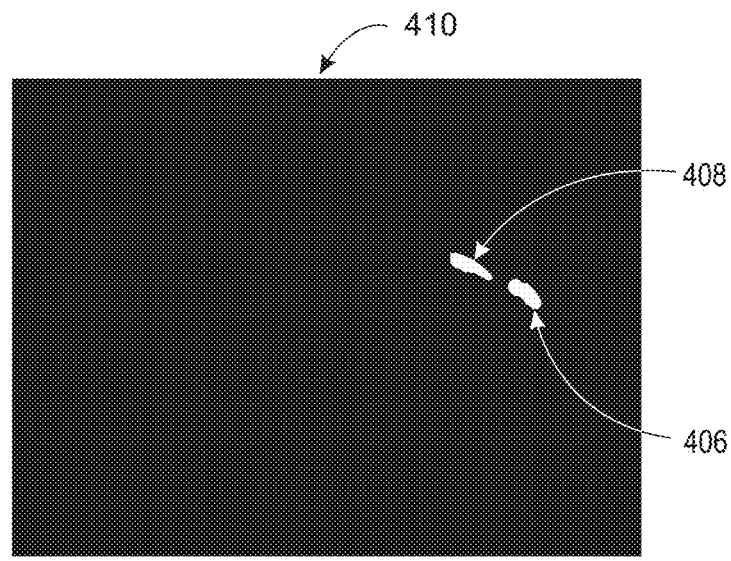
Figure 4D:
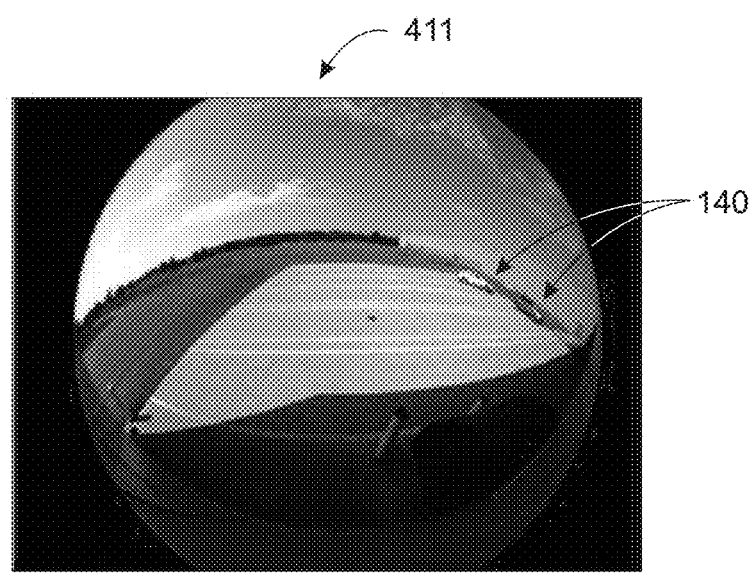
Figure 4E:
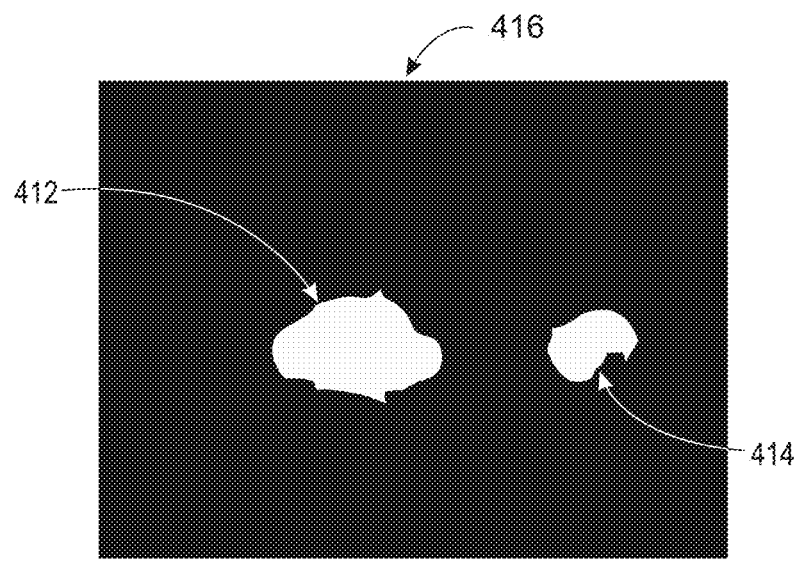
Figure 4F:
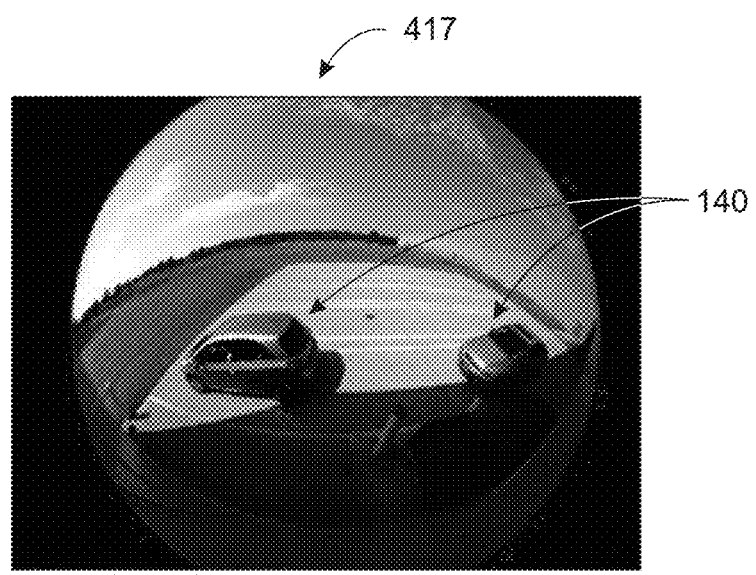

FIGS. 4A-4F are an illustration of an example usage of size and orientation awareness in motion detection processes. The example of FIGS. 4A-4F depict two objects of interest 140, e.g., vehicles, moving around a scene, e.g., a parking lot, which is being monitored by a suitable video acquisition unit 110 inclusive of a video camera 134, e.g., a fisheye camera. As illustrated in FIGS. 4A-4F, the apparent size and orientation of the vehicles 140 change drastically. FIGS. 4A, 4C, and 4E show binary masks 142 corresponding to the input frames 144 from FIGS. 4B, 4D, and 4F, respectively. The motion blobs 400 and 402 depicted on the binary output 142, i.e., the binary mask 404 in FIG. 4A (corresponding to the video frame 405 of FIG. 4F), are 892 and 967 pixels in size and are at an orientation of 19° and 7°, respectively. In contrast, the blobs 406 and 408 in the mask 410 from FIG. 4C (corresponding to the video frame 411 of FIG. 4F) are 1,459 and 1,507 pixels in size and are at an orientation of −26° and −37°, respectively. Lastly, the blobs 412 and 414 in the mask 416 from FIG. 4E (corresponding to the video frame 417 of FIG. 4F) are 32,462 and 11,186 pixels in size and are at an orientation of −3° and 25°, respectively.

To achieve the appropriate selectivity of moving objects 140 according to their size, orientation and location, the object detection unit 112 forwards the pixel coordinates corresponding to the detected foreground/moving object 140 to the size and orientation determination unit 118. In accordance with one embodiment, the size and orientation determination unit 118 (which is aware of the predominant object size and orientation of an object 140 as a function of location) creates the required structuring elements 164 for the morphological operations related with the computation of the foreground/motion binary mask, e.g., 404, 410, 416. It will be appreciated that the morphological operations perform hole-filling in masks that result from the initial thresholding operation, as well as removal of identified objects with sizes and/or orientations outside a pre-specified range depending on the object location, as discussed in detail below. The presence of noise or random motion of objects other than the ones being tracked may lead to other blobs besides 400, 402, 406, 408, 412, and 414. Also, the blobs of the objects 140 being tracked may not be contiguous or may have internal holes. An adequate structuring element 164 can eliminate spurious blobs and internal holes. In morphology, a structuring element 164 determines a shape used to interact with a given image. For example, a structuring element 164 of a given width and height can be used as an erosion or opening element on a binary mask 142 containing identified foreground or moving objects so that objects with width or height smaller than those of the structuring element 164 will be eliminated from the mask 142. Similarly, holes within an object 140 may be removed with the morphological operations of dilation or opening, with a structuring element 164 greater than the dimensions of the holes. Morphological opening and closings with structuring elements 164 are often used in conjunction to remove spurious objects and holes within a binary mask 142. In the context of the subject application, the expected dimensions and orientation of an object and noise-induced holes as a function of its location 148 within the field of view of the camera 134 can be used to determine the appropriate dimensions and orientation of the structuring elements 164 used in the different morphological operations that follow a frame-differencing or background subtraction operation. Note that the attributes of the structuring elements 164 used in morphological operations being performed may be spatially dependent.

According to other aspects, computer vision techniques for object recognition and localization can be used on still images. It will be appreciated that such techniques entail a training stage wherein the appearance of multiple sample objects in a given feature space (e.g., Harris Corners, scale invariant feature transform (SIFT), histogram of oriented gradients (HOG), local binary patterns (LBP), etc.) may be fed to a classifier (e.g., support vector machines (SVM), expectation maximization (EM), neural networks, k nearest neighbors (k-NN), other clustering algorithms, etc.) that may be trained on the available sample feature representations. The trained classifier can then be applied to features extracted from frames of interest and perform detection of objects of interest in the scene in a stand-alone manner; alternatively, it can be used in conjunction with the aforementioned motion and foreground detection techniques and determine if the initially detected motion blob is the object of interest with high probability. In either case, the parameters of bounding boxes (e.g., location, width and height) surrounding the matching candidates can be output.

Figure 5:
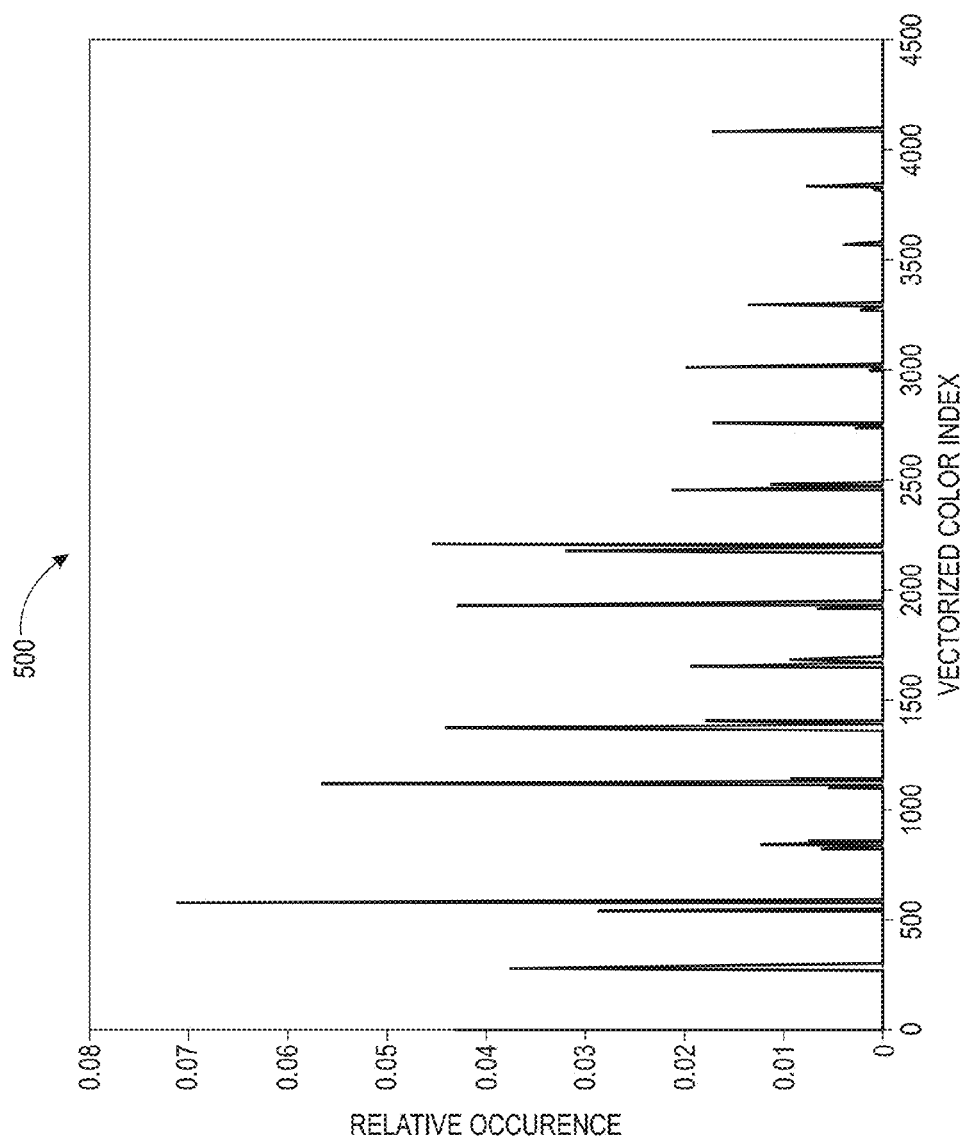
FIG. 5 is an illustration of a histogram corresponding to the object detected in FIGS. 4A-4F.

The instructions 108 stored in memory 106 may also include an object characterization unit 114 that is configured to establish a target object representation of the image area determined by the object detection unit 112 to contain an object of interest 140. In one aspect of the subject embodiments, color features of the kernel 146 associated with the detected object 140 are used to represent an object in motion. For example, a 16-bin, three-dimensional histogram 500 of the RGB pixel values within the region where motion is detected is constructed. FIG. 5 shows the histogram 500 corresponding to the object 140, i.e., the first vehicle, detected in FIG. 4A. For visualization purposes, the $16^3$-color tensor has been vectorized into a 4096 dimensional vector.

Other feature representations, including texture appearance (LBP histograms), gradient magnitude (HOG) and clouds of point descriptors such as Harris Corners, SIFT and SURF, may be utilized in accordance with varying aspects of the subject embodiments. It will be appreciated that the object representation of an image region or kernel 146 may be highly dependent on its location, size and orientation, and the systems and methods set forth herein utilize the selection of appropriate kernel parameters for tracking. The object characterization unit 114 receives the current frame 144 and a corresponding binary image 142 containing the pixel location of foreground or moving objects that have been classified as valid objects by the object detection unit 112. The object characterization unit 114 extracts features from the current frame 144 at the locations indicated by the binary image 142, and communicates this set of features of the object(s) of interest 140 detected in the current frame 144 to the object localization unit 116. It then forwards the location information of the identified valid objects to be tracked to the size and orientation determination unit 118, which, based on the received data, determines the appropriate, i.e., apparent, size and orientation of the kernel 146 and transmits it to the object characterization unit 114.

Figure 6A:
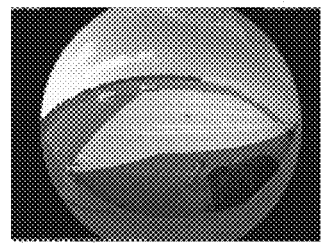
FIGS. 6A-6E are illustrations of kernel size, location, and orientation as used in the video-based system for optimizing tracking an object of interest in accordance with one aspect of the exemplary embodiment.
Figure 6B:
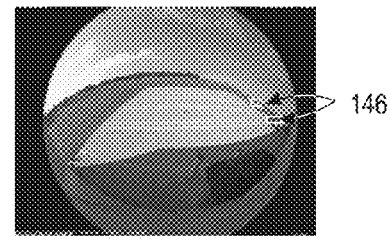
Figure 6C:
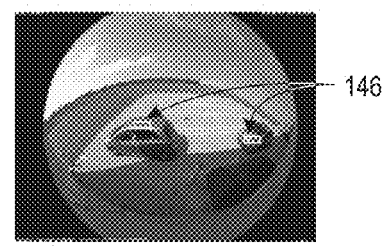
Figure 6D:
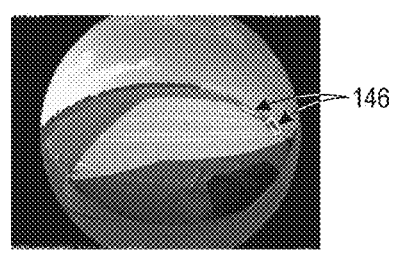
Figure 6E:
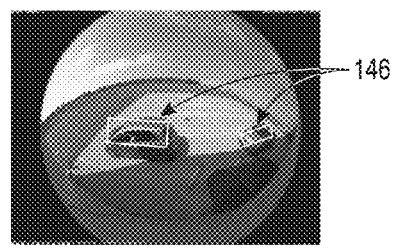

FIGS. 6A-6E illustrates the need for a size and orientation dependent kernel 146. As shown, FIG. 6A depicts the image region (e.g., the kernel 146) in which an initial object representation was computed for a vehicle. FIGS. 6B and 6C show the image region utilized by previous tracking implementations that does not adapt the size or orientation of the tracking kernel 146. That is, it will be appreciated that the tracking kernels 146 on the objects 140 remain of the same size and orientation in both FIGS. 6B and 6C while the actual size and orientation of the objects 140 have changed. In contrast, according to one aspect of the subject embodiments, FIGS. 6D and 6E illustrate the size and orientation adaptability of the kernel 146 utilizing the systems and methods set forth herein, e.g., the size and orientation of the kernels 146 change in conjunction with the size and orientation of the objects 140. It will be appreciated that, given the significant effect of perspective and distortion, the initial characterization of the objects includes the full body of the vehicle. It will further be appreciated that previous systems and methods for object tracking failed to adapt to changes in perceived size or orientation of the object being tracked, and as such would subsequently sample significantly different areas than those corresponding to the object of interest, thereby leading to errors in tracking. For example, the initial representation of the vehicle from FIG. 6A may contain information about the windows of the vehicles, whereas the representation illustrated in FIG. 6C may not. It will further be appreciated the initial representation from FIG. 6A may contain little background information, whereas a significant portion of the background may be captured by the tracker in FIG. 6B.

Returning to FIG. 1, the instructions 108 further include the object localization unit 116 that is configured to determine the location 148 of the object 140 being tracked on a frame-by-frame basis via finding the candidate kernel 146 with the appearance that best matches the appearance of the target kernel 146. That is, the object localization unit 116 is configured to find the location 148 of the candidate object 140 whose representation best matches the target object 140 representation computed by the object characterization unit 112.

In accordance with one aspect of the subject embodiments, the object localization unit 116 may utilize two methodologies in performing the aforementioned search for candidate objects 140 that best match corresponding target objects in the captured video 138. Combinations of both methodologies are also possible. The first methodology capable of implementation by the object localization unit 116 utilizes a search process that assumes that the object location, size and orientation change smoothly across frames, and the searches are performed for candidate objects with the current size and orientation. After the location 148 of the best matching candidate is determined, its size 150 and orientation 152 can be adjusted based upon input from the size and orientation unit 118. In this case, exchange of information between the localization unit 116 and the size and orientation unit 118 occurs at least twice, once at the beginning of the search, and once at the end of the search.

The second methodology capable of implementation by the object localization unit 116 utilizes a search process that is constantly aware of the predominant size 150 and orientation 152 of the candidate search location 148, and, at every iteration of the search process, transmits the location of the candidate kernel 146 to the size and orientation unit 118. Responsive thereto, the object localization unit 116 receives the expected size 148 and orientation 150 of the candidate kernel 146, according to its location 152. For example purposes, the operation of the object localization unit 116 may be illustrated in the context of template matching, point tracking, mean-shift tracking, and particle filter tracking. However, it will be appreciated that the subject systems and methods are equally adaptable to other object tracking methodologies utilizing the optimization techniques set forth herein.

With respect to template-matching tracking, operations are performed by searching for the best match in terms of a similarity metric between the template and a set of candidate samples. In contrast to mean shift tracking (discussed below), which performs iterative searches, template matching performs an exhaustive search within the neighborhood of interest. Accordingly, template-matching tracking may begin with the representation of a sub-image of a given size and orientation centered at a detected motion blob corresponding to the object 140 to be tracked at the initial frame 144. For the subsequent frames within the neighborhood of interest, normalized correlations between the template representation and the representations of the candidate windows of the current frame 144 are calculated; the position where the maximal normalized correlation occurs is considered as the position of the tracked object 140 in the current frame 144. The size and orientation unit 118 can perform correlations between the current object representation and candidate object representations at different neighboring locations, each of which can be associated with a region of a given size and orientation, as determined by the size and orientation unit 118. Iterations of this procedure are then performed until the tracking of the current object 140 is completed (e.g., when the object 140 leaves the scene or is outside of region of interest). Additionally, the template may be updated from frame to frame using a sub-image centered at the current tracked position and with a specific size 150 and orientation 152, again as determined by the size and orientation determination unit 118.

With respect to point tracking, features identifying salient points in the region of interest (e.g., kernel 146) corresponding to the object 140 being tracked are extracted, and individual point or group correspondences are found across adjacent frames. Such features include, but are not limited to SIFT, SURF, Harris Corners, and KLT features. In one embodiment, as correspondences are found between a set of features extracted from two instances of one object being tracked across temporally adjacent frames 144, an affine consistency check between both sets of features is performed by the size and orientation unit 118. This check is performed to verify that the relative spatial location between both sets of features is consistent both with the tracked object motion, as well as with the anticipated change in size 150 and orientation 152. Specifically, the affine transformation describing the changes undergone by the feature set between adjacent frames is checked for consistency with the expected change in size and orientation of the object relative to its change in location.

With respect to mean-shift tracking, operations are performed by iteratively maximizing a similarity metric (e.g., Bhattacharyya Coefficient) between the target color histogram representation and a set of candidate histogram representations in a neighborhood centered at the current location of the target, i.e., a region of interest (e.g., kernel 146) in the frame 144. A suitable example of a histogram 500 is depicted in FIG. 5, as discussed above. As will be appreciated, instead of exhaustively searching across all possible candidates, mean-shift is configured to estimate the gradient of the similarity metric and performs a gradient ascent algorithm that is capable of maximizing the similarity between the target histogram representation and the candidates (i.e., the histogram representations of the candidates) in the search area. In accordance with one embodiment, the size 150 and orientation 152 of the object 140 varies smoothly between temporally adjacent frames 144, whereby mean-shift can be performed at the local scale and orientation to find the location 148 of the best matching candidate kernel 146. Subsequently, the size 150 and orientation 152 of the kernel 146 are updated according to its new location 148.

With respect to particle filter tracking, operations are performed by estimating a probability density of the state of the system, which typically includes (but may not be limited to) the location of the object being tracked. This density may be represented as a set of weighted samples or particles. The set of particles contains more weight at locations where the object 140 being tracked is more likely to be. Knowledge about the object size 150 and location 148 can be used in a sampling stage of the subject methodology, where the number and spatial distribution of particles disseminated across a particular region can be adjusted according to the expected object shape, including its size and orientation.

The instructions 108 further include the object size and orientation unit 118 configured to determine the size and orientation of the tracking kernel 146 as a function of its location within the image, i.e., the video frame 144. The dependence of the object size on its location can be performed in several ways. In one implementation, if information regarding the geometric setup of the camera 134 (i.e., the camera's height above the ground and angle between the optical axis and the vector to the ground) along with its intrinsic parameters is known (i.e., the geometric mapping function of a lens, such as a fisheye lens), the apparent size of the objects 140 can be estimated a priori via camera calibration techniques, particularly under known constraints of motion (e.g., vehicles are on the ground). The a priori information utilized by the object size and orientation unit 118 may be determined from historical information, e.g., past size 150 and orientation 152 of objects of interest 140 stored in an associated data storage 128, via a remote source 160 in data communication with the computer system 102 via a suitable communications link 162, or the like. The remote source 160 may comprise sizes 150 and orientations 152 corresponding to the regularized motion environment 141 in which the camera 134 is positioned, as well as environment rules 156, image capture device information 158, and the like. The communications link 162 may comprise, for example, wired or wireless links, the Internet, an intranet, or the like.

Figure 7A:
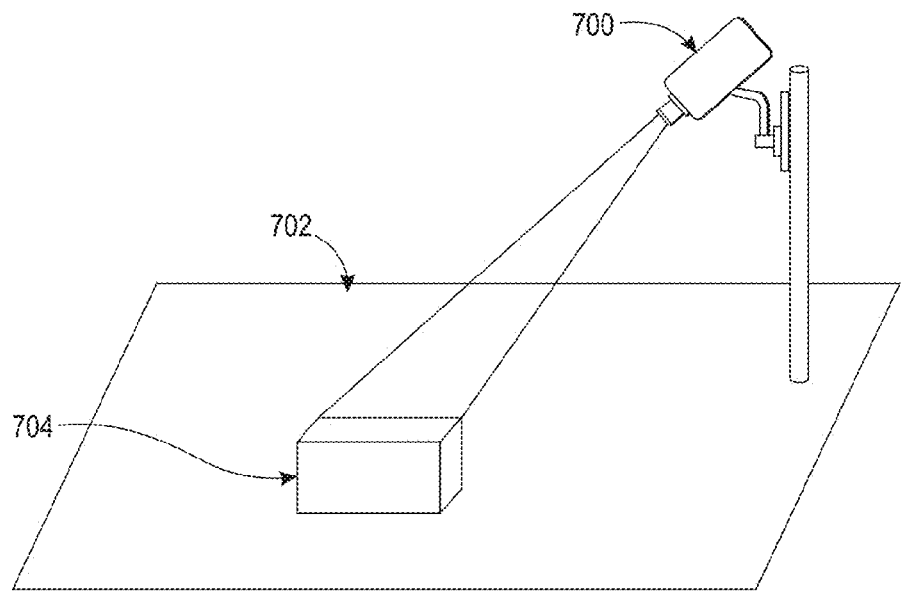
FIG. 7A is an illustration of a video camera viewing an abstraction of a vehicle in accordance with one aspect of the exemplary embodiment.
Figure 7B:
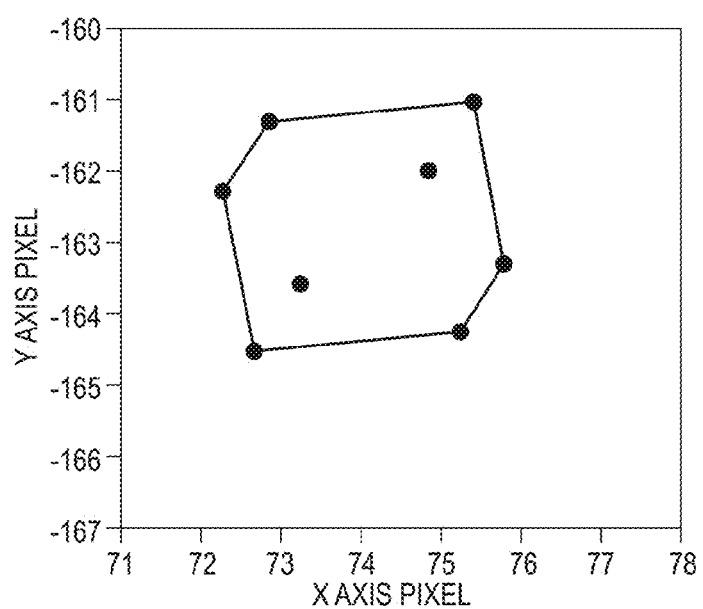
FIG. 7B is an illustration of a mapping of corners of the abstraction depicted in FIG. 7A to an image plane in accordance with one aspect of the exemplary embodiment.

An example of such an estimation for a fisheye camera 134 is shown in FIGS. 7A-7B. FIG. 7A shows a camera 700 mounted above the ground 702 and an abstraction (i.e., a representation) of a vehicle, represented by a rectangular prism 704 on the ground 702, i.e., the road, parking lot, etc. From a priori knowledge of the road, the angle of the car 704 on the road surface 702 can be estimated. From knowledge of the mapping function of the lens, each point at the corner of the rectangular prism 704 can be mapped to a pixel on the camera 700. The inputs to the mapping function are the height of the camera 700 above the road 702 and the coordinates of the vehicle, i.e., the prism 704 relative to the camera 700. FIG. 7B provides an illustration of a mapping of corners of the rectangular prism 704 to an image plane. As shown in FIG. 7B, the area of the convex hull of the 8 corners of the rectangular prism 704, mapped to the imaging plane of the camera 700 gives the estimated area of the vehicle represented by the prism 704 at this position in the field of view.

Figures 8A, 8B:
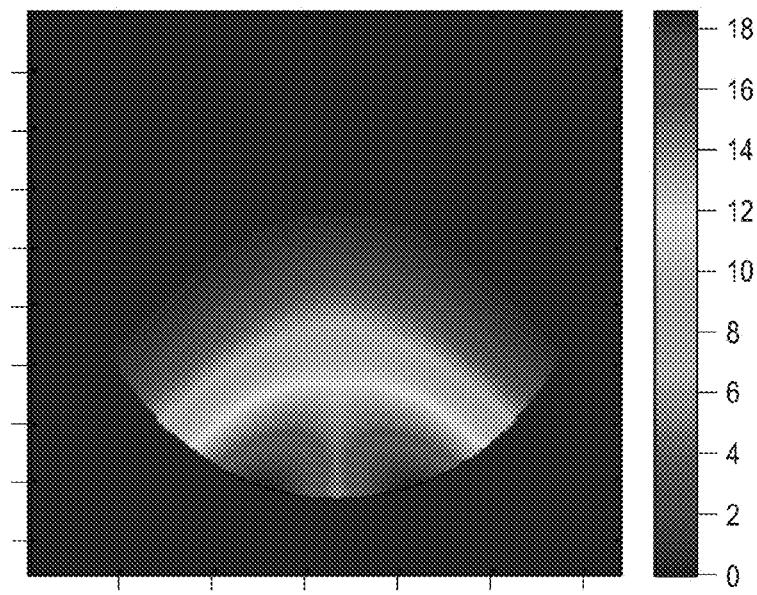
FIGS. 8A-8B are illustrations of pseudo-colored maps respectively illustrating apparent size and orientation of an object of interest illustrated in FIGS. 3-7B.

A sample result of this calculation for the fisheye camera is shown in FIG. 8A. The coordinates of the plot give the coordinates of a pixel of the camera that detects the object. Note that as in FIGS. 3, 4, and 6, a fisheye lens field of view is captured in a circular area on the image plane. For a given point in the 2-D plot, the magnitude of the value at that point gives the relative size of the object if it is detected at that particular location in the field of view. For example, if the vehicle, i.e., the rectangular prism 704, is in the lower right portion of the image (dark red), it will take up twice as much area in the image plane as compared to if it is located in the green areas of the image.

In accordance with one aspect, the expected size and orientation of the objects can be learned over time by performing object detection repeatedly and storing the pixel size 150 and orientation 152 of the detected objects 140 as a function of their location 148, e.g., the object information 154 of the associated data storage device 128. FIG. 8A shows a pseudo-colored object size map corresponding to the camera 134 and scene used in the experimental setup and obtained via calibration. FIG. 8B shows the learned orientation pattern for the example scenario described above. The orientation 152 in FIG. 8B can be used or calculated a priori from the known motion pattern along with the known shape and dimension of the object 140 being tracked (e.g., current or previously generated object information 154) to provide a more accurate estimation of the silhouette used in the calculation that gave FIG. 8A. For example, while both the apparent size 150 and orientation 152 of moving vehicles 140 change in the scenario under consideration, orientation of the corresponding kernel 146 would change little in the case of pedestrian tracking; in that scenario, the perspective and distortion would mainly affect the kernel size—that is, as long as pedestrians are always standing.

The computer system 102 may include one or more input/output (I/O) interface devices 119 and 120 for communicating with external devices. The I/O interface 119 may communicate, via communications link 132, with one or more of a display device 124, for displaying information such as returned images, search results, object identification, video frame stills, queries, and the like, and a user input device 126, such as a keyboard or touch or writable screen, for inputting text, and/or a cursor control device, such as a mouse, trackball, or the like, for communicating user input information and command selections to the processor 104.

The various components of the computer system 102 associated with the system 100 may all be connected by a data/control bus 122. The processor 104 of the computer system 102 is in communication with associated data storage device 128 via a communications link 130 coupled to the I/O interface 119. A suitable communications link 130 may include, for example, the public-switched telephone network, a proprietary communications network, infrared, optical, or other suitable wired or wireless data communications channel. The data storage device 128 is capable of implementation on components of the computer system 102, e.g., stored in local memory 106, i.e., on hard drives, virtual drives, or the like, or on remote memory accessible to the computer system 102.

The associated data storage device 128 corresponds to any organized collection of data (e.g., video files, binary outputs, kernels, objects, etc.) used for one or more purposes. Implementation of the associated data storage device 128 is capable of occurring on any mass storage device(s), for example, magnetic storage drives, a hard disk drive, optical storage devices, flash memory devices, or a suitable combination thereof. The associated data storage 128 may be implemented as a component of the computer system 102, e.g., resident in memory 106, or the like. In one embodiment, the associated data storage device 128 may store video 138 acquired by the video acquisition unit 110 from the video camera 138. The data storage device 128 may further store object information 154 comprising pixel size 148, orientation 150 and location 152 data corresponding to one or more objects of interest 140 in a particular video 138 or video frame 144. The data storage device 128 may further store rules 156 corresponding to one or more regularized motion environments 141, e.g., speed limits, size restrictions, traffic flow, etc. According to one embodiment, video acquisition device information 158 is also stored in the associated data storage device 128 that may include, for example, the type of video camera 134, the lens used, the location of the camera 134 relative to the regularized motion environment 141, the frame rate, resolution, etc.

It will be appreciated that the video-based system 100 for tracking an object of interest illustrated in FIG. 1 is capable of implementation using a distributed computing environment, such as a computer network, which is representative of any distributed communications system capable of enabling the exchange of data between two or more electronic devices. It will further be appreciated that such a computer network includes, for example and without limitation, a virtual local area network, a wide area network, a personal area network, a local area network, the Internet, an intranet, or any suitable combination thereof. Accordingly, such a computer network comprises physical layers and transport layers, as illustrated by various convention data transport mechanisms, such as, for example, Token-Ring, Ethernet, or other wireless or wire-based data communication mechanisms. Furthermore, while depicted in FIG. 1 as a networked set of components, the systems and methods discussed herein are capable of implementation on a stand-alone device adapted to perform the methods described herein.

The computer system 102 may include a computer server, workstation, personal computer, cellular telephone, tablet computer, pager, combination thereof, or other computing device capable of executing instructions for performing the exemplary method. According to one example embodiment, the computer system 102 includes hardware, software, and/or any suitable combination thereof, configured to interact with an associated user, a networked device, networked storage, remote devices, or the like.

The memory 106 may represent any type of non-transitory computer readable medium such as random access memory (RAM), read only memory (ROM), magnetic disk or tape, optical disk, flash memory, or holographic memory. In one embodiment, the memory 106 comprises a combination of random access memory and read only memory. In some embodiments, the processor 104 and the memory 106 may be combined in a single chip. The network interfaces 119 and/or 120 may allow the computer system 102 to communicate with other devices via a computer network, and may comprise a modulator/demodulator (MODEM). Memory 106 may store data processed in the method as well as the instructions for performing the exemplary method.

The digital processor 104 can be variously embodied, such as by a single core processor, a dual core processor (or more generally by a multiple core processor), a digital processor and cooperating math and/or graphics coprocessor, a digital controller, or the like. The digital processor 104 in addition to controlling the operation of the computer system 102, executes the instructions 108 stored in the memory 106 for performing the method outlined in FIGS. 9-10.

The term "software," as used herein, is intended to encompass any collection or set of instructions executable by a computer or other digital system so as to configure the computer or other digital system to perform the task that is the intent of the software. The term "software," as further used herein, is intended to also encompass such instructions stored in storage mediums, such as RAM, a hard disk, optical disk, or so forth, and is intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 9:
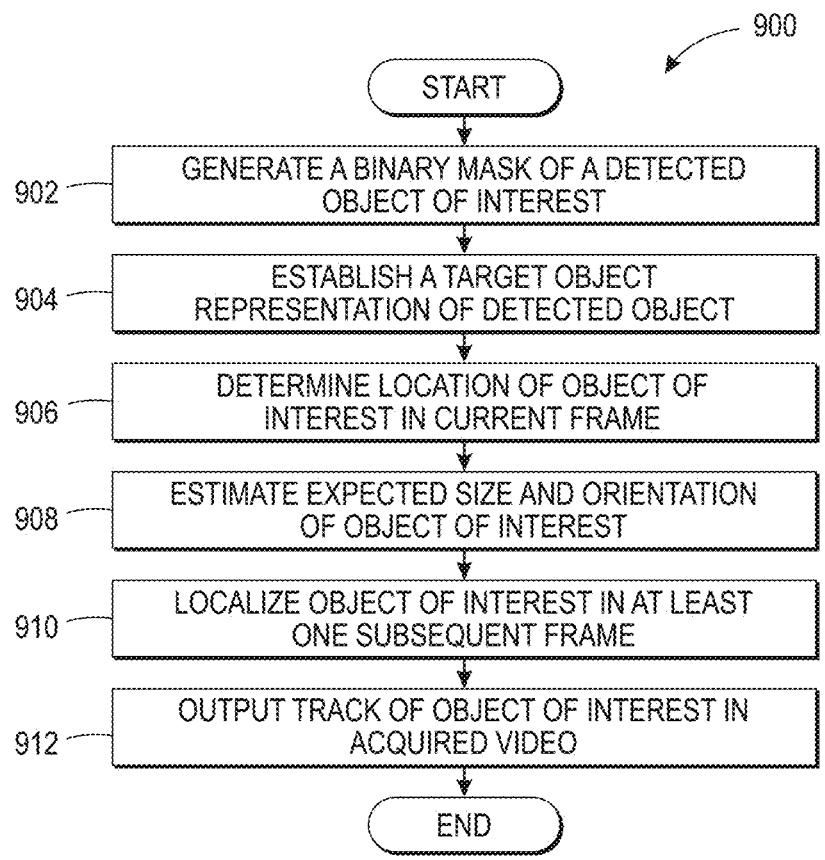
FIG. 9 is a flowchart that illustrates one aspect of the method for optimizing video-based tracking of an object of interest according to an exemplary embodiment.

Turning now to FIG. 9, there is provided an overview of the exemplary method for optimizing video-based tracking of an object of interest. The method 900 begins at 902, whereupon the computer system 102 generates a binary mask 142 of a detected instance of an object of interest 140 in one of a plurality of video frames 144. As discussed above, the object of interest 140 may be detected via a plurality of different means associated with a current or previously acquired video 138 of a regularlized motion environment 141. In one embodiment, the detected instance of the object of interest 140 may be at a known location in the field of view of a camera 134, e.g., a prepositioned sensor, gate, or the like. Upon activation of the sensor or gate, an object of interest 140 would be "detected" along with an initial position of the object of interest 140, based upon the geometry of the camera and the position of the sensor, gate, or the like. Thereafter, operations would proceed to generate the binary mask 142 as depicted in FIG. 9.

A target object representation of the detected instance of the object of interest 140 is then established at 904 in accordance with the generated binary mask 142. At 906, the location 148 of the object of interest 140 in the frame 144 is determined in accordance with the target representation of the detected instance of the object of interest 140.

At 908, an expected size and an expected orientation of the object of interest 140 is estimated as a function of the location of the object in the frame 144. That is, the size and orientation unit 118 determines an apparent or expected size 150 and orientation 152 of the object 140 using the location 148 of the object 140 in the frame 144, the position of the camera 134 relative to the regularized motion environment 141, and the like. At 910, the object of interest 140 is localized in at least one subsequent frame 144 of the video 138 using the expected size 150 and orientation 152, thereby enabling tracking of the object of interest 140 in the video 138. Thereafter, at 912, the track of the object of interest 140 in the acquired video 138 is output by the computer system 102 whereupon operations with respect to FIG. 9 terminate.

Figure 2:
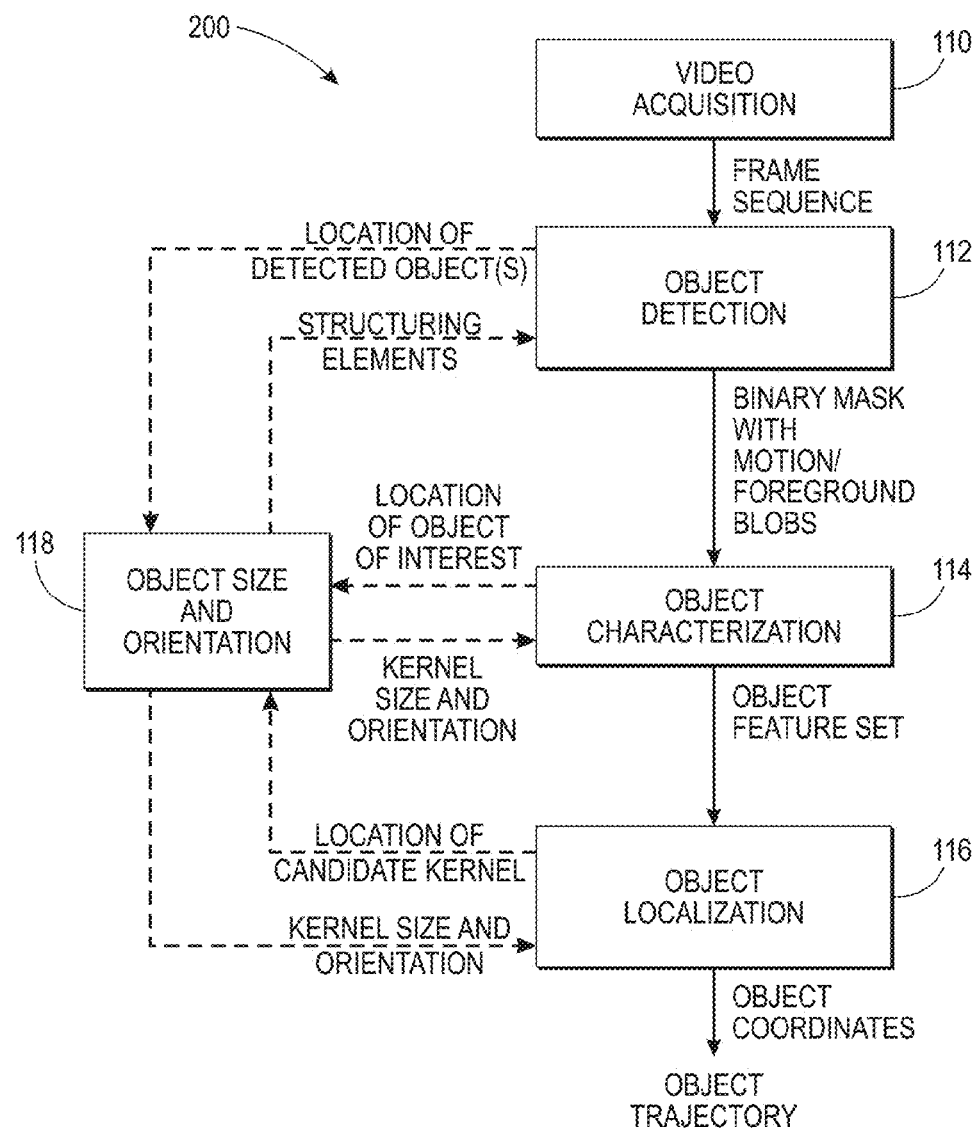
FIG. 2 is a functional block diagram of the interaction of components of the video-based system for optimizing tracking an object of interest shown in FIG. 1 in accordance with one aspect of the exemplary embodiment.
Figure 10:
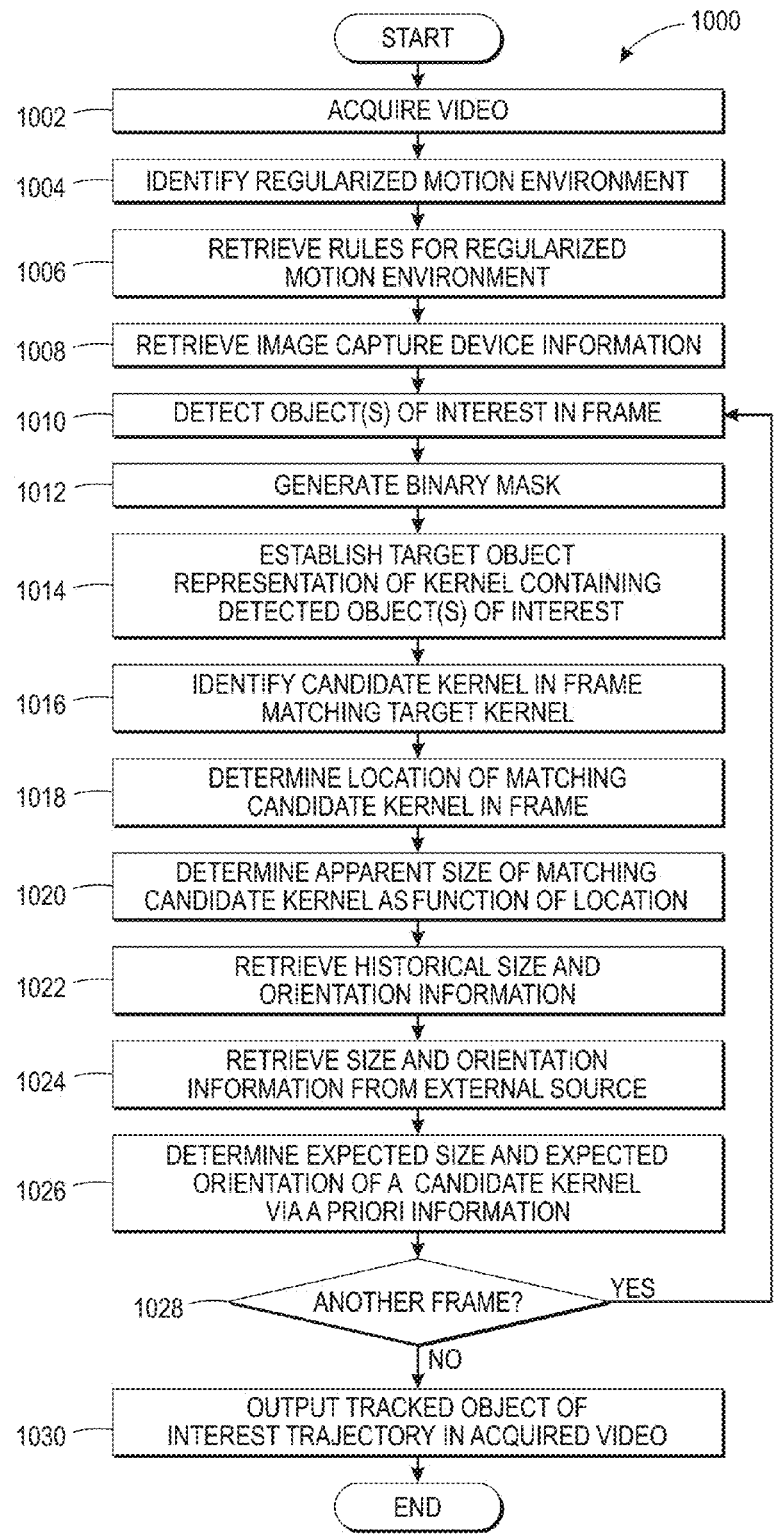
FIG. 10 is a flowchart that illustrates another aspect of the method for optimizing video-based tracking of an object of interest according to an exemplary embodiment.

Turning now to FIG. 10, there is shown an expanded view of the optimized method 1000 for video-based tracking according to an example implementation of the subject application. It will be appreciated that the order set forth hereinafter of the various steps in FIG. 10 are intended to illustrate one possible flow of operations of the aforementioned methodology. Accordingly, the various steps may be performed sequentially, in parallel, or in any manner of order as will be appreciated and as illustrated in FIG. 2, such that outputs of one or more of the units 110-118 may be used as inputs by successive or preceding units. In accordance with the example implementation, the video 138 referenced hereinafter is collected by an image capture device, i.e., via a video camera 134 employing a fish-eye lens. It will be appreciated that other lens/camera combinations may also be utilized in accordance with the systems and methods set forth in the subject application. The method begins at 1002, whereupon the video acquisition unit 110 acquires video 138 from the video camera 134 of a regularized motion environment 141, e.g., a parking lot, highway, drive-through, or the like.

At 1004, the computer system 102 or other suitable component associated with the system 100 identifies the regularized motion environment 141 from which the video 138 is acquired. Rules 156 corresponding to the identified regularized motion environment 141 are then retrieved from the associated data storage device 128 at 1006. At 1008, video acquisition device information 158 is retrieved from the associated data storage 128 corresponding to the type of camera 134, the lens used, the known location of the camera 134 relative to the regularized motion environment 141, and the like.

One or more objects of interest 140 are then detected in a frame 144 at 1010 via the object detection unit 112 stored in instructions 108 of the computer system 102. In one embodiment, the object detection unit 112 is configured to utilize the known rules 156 and image capture device information 158 to assist in detecting objects of interest 140 in an initial video frame 144 of the acquired video 138. For example, the rules 156 may generally indicated to the unit 112 a location in the environment 141 in which an object 140 could or could not be found, and the device information 158 utilized by the unit 112 in color processing, lighting or distortion effects, and the like. The object detection unit 112 then generates a binary mask 142 corresponding to the detected object(s) of interest 140, e.g., corresponding to the motion/foreground blobs of an object of interest 140 at 1012, and communicates the mask 142 to the object characterization unit 114.

In accordance with one embodiment, a double difference technique followed by morphological operations may be implemented by the object detection unit 112 to detect the initial instance of an object of interest 140 in the incoming video 138. The morphological operations discard objects in motion with size and orientation outside pre-determined ranges determined by the object size and orientation determination 118. In one embodiment, structuring elements 164, as will be appreciated, are received from the object size and orientation unit 118 by the object detection unit 112 to generate the mask 142 at 1012. See, e.g., the discussion of FIGS. 4A-4F above. As previously addressed, other methodologies for object recognition and localization may be utilized by the object detection unit 112 in accordance with the systems and methods set forth herein, e.g., training methodologies, etc.

In accordance with one embodiment, the object size and orientation unit 118 or other suitable component associated with the system 100 may generate structuring elements 164 for morphological operations during the mask creation at 1012. Such structuring elements 164 may be ascertained from the expected size and orientation determined by the object size and orientation unit 118 in accordance with a priori information, as discussed above. It will be appreciated that the morphological operations perform hole-filling in masks that result from the initial thresholding operation, as well as removal of identified objects with sizes and/or orientations outside a pre-specified range depending on the object location, as discussed above with respect to FIGS. 4A-4F. It will be further be appreciated that the structuring elements 164 for mask creation may be communicated to the object detection unit 112 for use on the next frame 144 of the captured video 138 to track the object(s) of interest 140 from frame to frame as performed by the object localization unit 116. In another embodiment, the structuring elements 164 correspond to points on a prism, as illustrated with respect to FIGS. 7A-7B discussed above.

Returning to FIG. 10, at 1014, the object characterization unit 114 receives the binary mask 142 from the object detection unit 112 and establishes a target object representation of the kernel 146 containing the detected object(s) of interest 140 from the binary mask 142 and the current frame. As discussed above, the object characterization unit 114 may utilize color features of the kernel 146 to represent an object in motion, e.g., FIG. 5, or other salient features of the object of interest 140, e.g., edge line features, texture-type features, corner points, etc., as color features may change of an object 140 based upon direct or indirect lighting, shadow occlusions, and the like. The object characterization unit 114 may also receive kernel size 150 and orientation 152 information from the object size and orientation unit 118 for use in establishing the target kernel 146 from the binary mask 142, as discussed above. Furthermore, as previously discussed, the object characterization unit 114 is in communication with the object localization unit 116 and the object size and orientation unit 118, such that the target object representation of the kernel 146 is communicated thereto.

At 1016, the object localization unit 116 receives the target object representation of the kernel 146 in the video frame 144 and identifies a candidate kernel(s) in the video frame 144 that matches the target kernel(s) 146. That is, the object localization unit determines the location 148 of the candidate object 140 whose representation best matches the target object 140 representation computed by the object characterization unit 112. The location 148 of this candidate kernel 146 is then communicated to the object size and orientation unit 118.

At 1022, the object size and orientation unit 118 retrieves historical size 150 and orientation 152 information from the data storage device 128 for use in determining the expected orientation and expected size of a candidate kernel 146 as discussed above. At 1024, the object and size orientation unit 118 may retrieve, via a suitable communications link and network (e.g., the Internet), size and orientation information from a third party remote source 160. It will be appreciated that steps 1022 and 1024 are included for example purposes. The methodology 1000 of FIG. 10 may use either, both, or neither sources of information in determining the expected size and orientation of a candidate kernel in a next subsequent frame 144.

Thereafter, at 1026, the object size and orientation unit 118 or other suitable component of the system 100 determines, via at least one of calculations or via the a priori knowledge of 1022 or 1024, the expected size 150 and orientation 152 of a candidate kernel 146 in a next subsequent frame 144. That is, the object size and orientation unit 118 estimates the size 150 and orientation 152 of a candidate kernel 146 as it should appear in the next subsequent frame 144 based upon the a priori knowledge or upon calculations utilizing the location 148 thereof. For example, the object size and orientation unit 118 is aware of the location of the camera 134 and the previous trajectory (size and orientation) of the object of interest 140 in the current frame and is thereby configured to calculate the size 150 and orientation 152 of the object of interest 140 in the next subsequent frame 144.

A determination is then made at 1028 whether another frame 144 in the video 138 remains for processing according to the methodology 1000 of FIG. 10, e.g., the video 138 has finished running, no objects 140 detected, or the like. Upon a positive determination, operations return to 1010 for detection of the object(s) of interest 140 in the next subsequent video frame 144 by the object detection unit 112. It will be appreciated, however, that the subsequent analysis of frames 144 in the video 138 the apparent kernel size and orientation, and the expected size and orientation generated by the object size and orientation unit 118, thereby optimizing the tracking of objects of interest 140 in the acquired video 138. Operations continue thereafter as set forth above with respect to 1012-1028.

Upon a determination at 1028 that no additional frames 144 remain for analysis in accordance with FIG. 10, operations proceed to 1030. At 1030, the optimized tracked object of interest trajectory in the acquired video 138 is output. For example, the output may be sent to the display device 124 in communication with the computer system 102, sent to the data storage device 128 for later review, communicated via a network to an external site, or the like.

The method illustrated in FIGS. 9-10 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 9-10, can be used to implement the method estimating origins and destinations for users of a transportation system.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for optimizing video-based tracking of an object of interest, comprising:
   acquiring, from a fixed position video camera having a wide-view lens, a video of a regularized motion environment comprising a plurality of video frames, the regularized motion environment having a stationary scene background;
   retrieving a set of rules of the regularized motion environment, the rules governing movement of an object within the regularized motion environment including at least two of a speed limit, a size restriction, a traffic flow, and/or a location in the regularized motion environment wherein an object of interest can be located or a location in the regularized motion environment wherein an object of interest cannot be located;
   detecting an initial instance of at least one object of interest in the plurality of video frames including a location thereof in accordance with the retrieved set of regularized motion environment rules;
   estimating both an expected size and an expected orientation of the at least one object of interest as a function of the location and a geometric mapping function of the wide-view lens of the fixed position video camera acquiring the video; and
   localizing the at least one object of interest in at least one subsequent video frame responsive to the estimated size and estimated orientation,
   wherein at least one of the acquiring, detecting, generating, determining, and localizing is performed by a computer processor.

2. The method according to claim 1, further comprising:
   generating a binary mask of the at least one object of interest in a current video frame; and
   generating a target representation of the at least one object of interest in accordance with the binary mask and the current video frame.

3. The method according to claim 2, wherein the expected size and the expected orientation of the at least one object of interest is determined in accordance with a geometry of a video camera acquiring the video of the regularized motion environment.

4. The method according to claim 2, further comprising generating a plurality of structuring elements in accordance with the expected size and orientation of the at least one object of interest as a function of the location, wherein morphological operations are performed on the binary mask in accordance with the plurality of structuring elements.

5. The method according to claim 1, wherein the expected size and orientation of the at least one object of interest as a function of the location are determined in accordance with historical information corresponding to size and orientation, wherein the historical information is associated with the regularized motion environment.

6. The method according to claim 1, wherein the expected size and orientation of the at least one object of interest as a function of the location are determined in accordance a remote source of information corresponding to size and orientation, wherein the remote source is associated with the regularized motion environment.

7. The method according to claim 1, wherein localizing the at least one object uses at least one of a template matching tracking, point feature tracking, a mean shift tracking, or a particle filter tracking.

8. A system for optimizing video-based tracking of an object of interest, comprising:
   a video acquisition unit configured for acquiring, from a fixed position video camera having a wide-view lens, a video of a regularized motion environment in memory, the video comprising a plurality of frames, wherein the regularized motion environment having a stationary scene background;
   an object detection unit configured for detecting an initial instance of an object of interest a frame of the plurality of video frames in accordance with a set of rules corresponding to the regularized motion environment, the rules governing movement of an object within the regularized motion environment including at least two of a speed limit, a size restriction, a traffic flow, and/or a location in the regularized motion environment wherein an object of interest can be located or a location in the regularized motion environment wherein an object of interest cannot be located;
   an object characterization unit configured for establishing a target object representation of the detected instance of the object of interest;
   an object localization unit configured for determining a location of the object of interest in the frame in accordance with the target representation of the detected instance of the object of interest;
   an object size and orientation unit configured for estimating a size and an orientation of the object of interest in a next subsequent frame as a function of the determined location and a geometric mapping function of the wide-view lens of the fixed position video camera acquiring the video; and
   a processor which implements at least one of the video acquisition unit, the object detection unit, the object characterization unit, the object localization unit, and the object size and orientation unit.

9. The system according to claim 8, wherein the object size and orientation unit is further configured for generating a plurality of structuring elements in accordance with the estimated size and orientation of the object of interest as a function of location in the next subsequent frame.

10. The system according to claim 9, wherein the object size and orientation unit is further configured to estimate the size and orientation of the at least one object of interest as a function of the location in accordance with historical information corresponding to size and orientation, wherein the historical information is associated with the regularized motion environment.

11. The system according to claim 9, wherein the object size and orientation unit is further configured to estimate the size and orientation of the at least one object of interest as a function of the location are determined in accordance a remote source of information corresponding to size and orientation, wherein the remote source is associated with the regularized motion environment; and wherein the object detection unit is further configured for modifying a binary mask of the object of interest in accordance with the plurality of generated structuring elements.

12. The system according to claim 11, wherein the object characterization unit establishes the target object representation of the detected instance of the object of interest in accordance with the generated binary mask and the current video frame.

13. The system according to claim 12, wherein the object localization unit is further configured to determine the location in accordance with at least one of a template matching tracking, a point feature tracking, a mean shift tracking, or a particle filter tracking.

14. A computer-implemented method for optimizing video-based tracking of an object of interest, comprising:
    acquiring, from a fixed position video camera having a wide-view lens, a video of a regularized motion environment comprising a plurality of video frames, the regularized motion environment having a stationary scene background;
    retrieving a set of rules corresponding to the regularized motion environment, the rules governing movement of an object within the regularized motion environment including at least two of a speed limit, a size restriction, a traffic flow, and/or a location in the regularized motion environment wherein an object of interest can be located or a location in the regularized motion environment wherein an object of interest cannot be located;
    detecting an instance of an object of interest in one of a plurality of video frames in accordance with the retrieved set of regularized motion environment rules;
    generating a binary mask of a detected instance of an object of interest in one of a plurality of video frames;
    establishing a target object representation of the detected instance of the object of interest in accordance with the generated binary mask;
    determining a location of the object of interest in the frame in accordance with the target representation of the detected instance of the object of interest and a geometric mapping function of the wide-view lens of the fixed position video camera acquiring the video;
    estimating a size and an orientation of the object of interest as a function of the location; and
    localizing the object of interest in a next subsequent frame responsive to the estimated size and orientation.

15. The computer-implemented method according to claim 14, wherein the estimated size and orientation of the at least one object of interest as a function of the location are determined in accordance with historical information or a remote source of information corresponding to size and orientation, wherein the historical information or the remote source of information is associated with the regularized motion environment.

16. The computer-implemented method according to claim 15, further comprising generating a plurality of structuring elements in accordance with the estimated size and orientation of the object of interest as a function of location in the next subsequent frame, wherein the binary mask is modified in accordance with the plurality of structuring elements, and wherein morphological operations are performed on the binary mask in accordance with the plurality of structuring elements.

17. The computer-implemented method according to claim 16, wherein the estimated size and orientation of the object of interest are estimated in accordance with a geometry of a video camera acquiring the video of the regularized motion environment.

18. The computer-implemented method according to claim 17, further comprising:
    detecting the instance of the object of interest in the one of the plurality of video frames.

19. The method according to claim 1, wherein the rules are representative of at least one of a speed limit, a size restriction, a traffic flow, a location in the regularized motion environment wherein an object of interest can be located or a location or a location in the regularized motion environment wherein an object of interest cannot be located.

20. The system according to claim 8, wherein the rules are representative of at least one of a speed limit, a size restriction, a traffic flow, a location in the regularized motion environment wherein an object of interest can be located or a location or a location in the regularized motion environment wherein an object of interest cannot be located.

* * * * *